No. 700,420. Patented May 20, 1902.
A. HARRIS.
APPARATUS FOR PURIFYING WATER.
(Application filed Nov. 16, 1901.)
(No Model.)
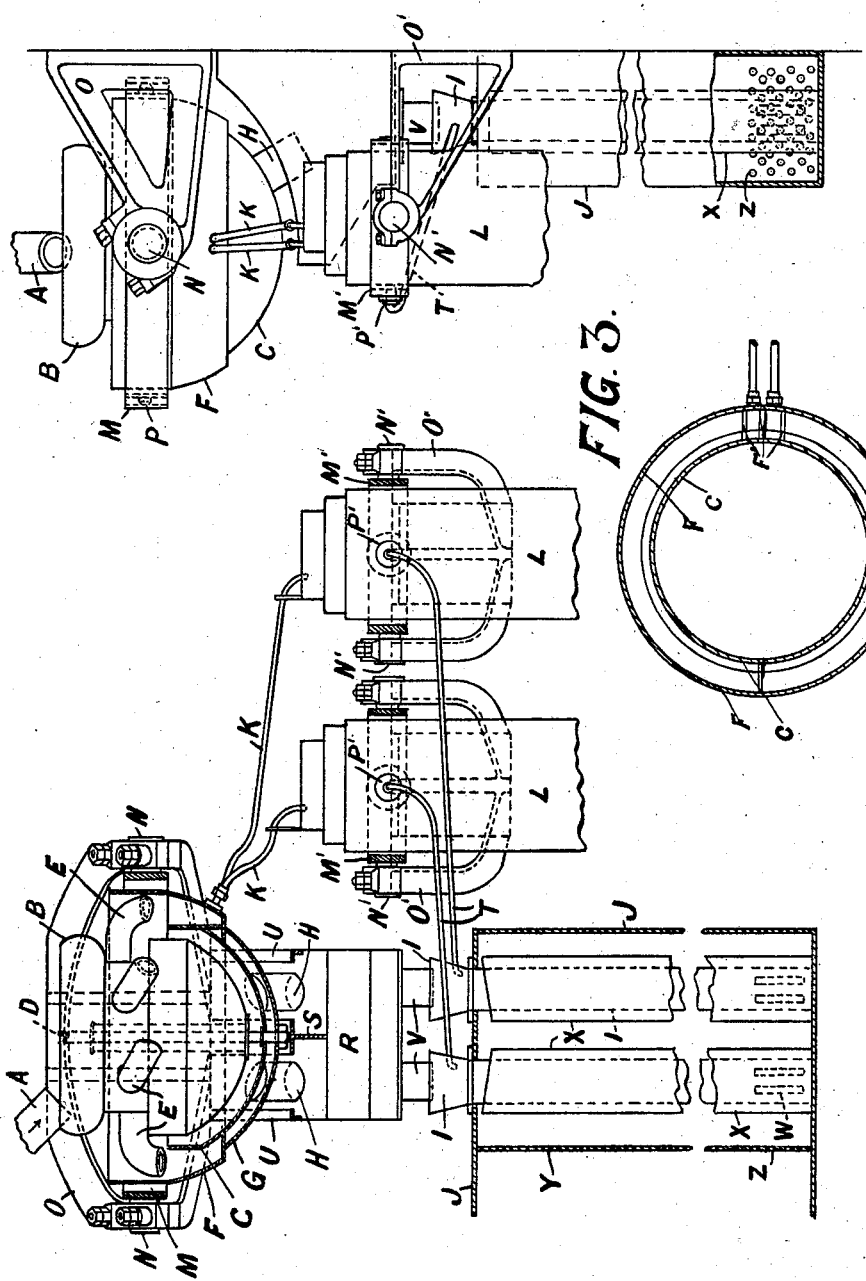
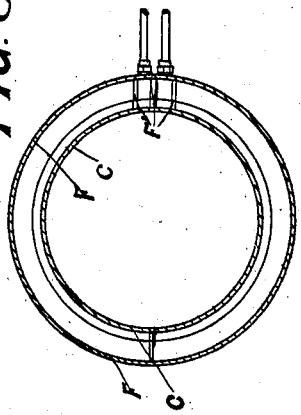
Witnesses
Edgar M. Kitchin
Ruth J. Mitchell
Inventor
Anthony Harris
by
Moran Fenwick & Lawrence.
Attorneys
THE NORRIS PETERS CO., PHOTO-LITHO., WASHINGTON, D. C.

UNITED STATES PATENT OFFICE.

ANTHONY HARRIS, OF LONDON, ENGLAND.

APPARATUS FOR PURIFYING WATER.

SPECIFICATION forming part of Letters Patent No. 700,420, dated May 20, 1902.

Application filed November 16, 1901. Serial No. 82,577. (No model.)

*To all whom it may concern:*

Be it known that I, ANTHONY HARRIS, engineer, a subject of the King of Great Britain, residing in the city of London, England, (whose full postal address is 73 Queen Victoria street, in the city of London,) have invented certain new and useful Improvements in or Connected with Apparatus for the Treatment or Purification of Feed-Water, (for which provisional protection has been obtained in England under No. 9,201, dated May 3, 1901,) of which the following is a specification.

This invention relates to apparatus for the treatment or purification of feed-water by the addition of reagents to form a precipitate to which the oleaginous and other impurities aggregate, and thus facilitate removal by filtration, decantation, or otherwise or by the addition of softening agents or other chemicals for the treatment of water for feed purposes, and has for its object to enable this class of apparatus to be successfully used in marine installations and in other cases in which it is subjected to movement. I have found that in cases where apparatus of this kind is subjected to movement, as in marine installations, the working of the system is more or less interfered with and either rendered unreliable or impossible. This is particularly the case with the revoluble distributer described in my Patent No. 667,127, dated January 29, 1901, and the solution-making apparatus such as, for instance, described in Anderson's patent, No. 649,035, dated May 8, 1900, which I have found require to be maintained at all times in a horizontal position as far as possible to insure a satisfactory working.

The present invention consists, therefore, in so mounting or supporting on gimbals or the like or otherwise freely suspending the vessels for dividing or distributing the crude water and for making and delivering the materials or solutions for treating the said water or the analogous parts or devices for the treatment of the feed-water in purifying systems that the same are maintained at all times in a horizontal position as far as possible.

In order to illustrate the carrying of my invention into effect, the same will now be described with reference to the accompanying drawings, which show the invention applied, as an example, to the revoluble distributer described in my Patent No. 667,127 and the solution-making apparatus described in Anderson's patent, No. 649,035, before referred to.

In the accompanying drawings, Figure 1 is a front elevation, partly in section, showing the distributer, solution-making apparatuses, and treatment-tank, the latter, together with its mixing-tubes, being shown broken to economize space in the drawing. Fig. 2 is an end elevation, partly in section, of the apparatus shown in Fig. 1. Fig. 3 is a detail top plan view of the distributing-trough around the tank.

A is the pipe bringing the total crude water to be treated.

B is the distributer, described in my aforesaid patent and consisting of a buoyant vessel, which receives the water from the pipe A. This vessel B floats in a tank C and is caused to rotate therein upon a vertical guide-spindle D by the reaction of the escaping streams of water delivered through its tangential nozzles E into an annular trough F, surrounding the tank C. This trough F is divided by radial partitions F' into compartments of different sizes, as shown in Fig. 3, which receive the liquid in proportion to their size in a ratio selected according to the feeds into which the liquid is to be divided or distributed. The crude water thus divided is delivered from the larger compartment or compartments into the treatment-tank J and from the smaller compartment or compartments into one or more solution-making apparatuses L, which deliver it in the form of chemical solutions into the said treatment-tank J.

The above distributer is shown freely suspended in accordance with the present invention by means of gimbals, consisting of a ring M, which is free to oscillate on trunnions N in a bracket O, in which ring M the distributer is supported by the trough F of its tank C on other trunnions P, displaced at ninety degrees to the trunnions N. The distributer B C F is thereby always maintained in a horizontal position. I prefer to form the lower portion of the revoluble vessel B and also the tank C, in which the same floats, of a bowl shape, as shown, and provide the tank C with one or more pockets or other passages G to bring the liquid from the compartments of the annular trough F to delivery pipes or nozzles H, which I prefer to arrange near the center of the tank-bottom. In the example shown in the drawings these pockets G and delivery-pipes H are shown arranged only for the larger compartments of the trough F, the smaller compartments for supplying the solutioners L being provided with flexible pipes K, leading to the solutioners.

A separate hopper or funnel-shaped receiver R is preferably rigidly supported below the distributer, with its mouth of sufficient size to allow free play to the said delivery pipes or nozzles H, which thus hang within it. Any number of them may be used, or a single receiver R may be subdivided by partitions, as shown, for instance, by the single partition S. In the case of marine installations the pipes H should have a much larger play in the direction of roll of the ship, as seen, for instance, in Fig. 2, than in the direction of pitch, as seen in Fig. 1, the mouth of the receiver R being dimensioned accordingly. The receiver R may also have a lip U turned inward on its upper edges to prevent the liquid splashing over. The tank or tanks J for mixing and treating or settling and storing the water, which are not usually dependent on a horizontal position for a satisfactory working or which are of such size and weight as to be ill adapted to the suspension mounting of my invention, may be placed directly below the said funnel-shaped receiver R, as shown in the drawings, or pipes with funnels or bell-mouths may be so placed as to directly receive and conduct the water or solutions to where required. The solutioners L or other analogous apparatus or vessels are similarly provided with gimbals M' N' P', supported on brackets O' in the same way as the distributer, and they may be used in connection with a separate funnel-shaped receiver similar to the receiver R, before described, or may deliver directly into the mouths of pipes, tanks, or treatment vessels, as desired. The drawings show the delivery from the solutioners L into the treatment-tank J by means of flexible pipes T, taken from the trunnions P', which are made hollow for that purpose.

Where two reagents are used for treating the water, two mixing-tubes I are provided in the tank J, and the water which is delivered from the receiver R by pipes or nozzles V is mixed in the tubes I with the chemical solutions brought from the solutioners L by the flexible pipes T, which lead each to a different mixing-tube. The water and chemicals pass out of the bottom of the tubes I through slots W into surrounding tubes X and rise up in the latter and pour over the top into one end of the tank J and then pass through perforations Z in the bottom of a partition Y into the main space of the tank J. In this way the water is treated in a successive manner first with one and then with the other chemical, as the two chemicals only come together in the tank J after being thoroughly mixed with the water first in the separate tubes I, and a proper action is attained. The treated water in the tank J may now have the impurities removed by filtration or by settling and decanting.

I claim as my invention—

1. In a water purifying or treating system the combination with solution-making vessels, and vessels for dividing and distributing the crude water of gimbals for freely suspending and maintaining the solution-making vessels at all times in a horizontal position, substantially as described.

2. In a water purifying or treating system, the combination with the vessels for dividing and distributing the crude water, and for making and delivering the treating agents, of gimbals supporting and maintaining the dividing and distributing vessels at all times in a horizontal position when their supports are subjected to movement, substantially as described.

3. In a water purifying or treating system, the combination with the vessels for dividing and distributing the crude water, and for making and delivering the treating solutions, of gimbals for freely suspending and maintaining these vessels in a horizontal position when their supports are subjected to movement, and flexible means to convey the water to and from the respective vessels or devices and to afford the necessary play to the same, substantially as described.

4. In a water purifying or treating system, the combination with the vessels for dividing and distributing the crude water, and for making and delivering the treating solutions, of gimbals for freely suspending and maintaining these vessels in a horizontal position when their supports are subjected to movement, and a wide-mouthed hopper or funnel shaped receiving device adapted to receive and deliver the liquid from the distributing vessel to where required and to afford the necessary play thereto, substantially as described.

5. In a water purifying or treating system, the combination with a vessel for dividing and distributing the crude water, of gimbals for freely suspending and maintaining the same in a horizontal position when their support is subjected to movement, a stationary receiving vessel, and means for receiving and delivering the divided streams to the stationary vessel and adapted to afford the necessary play to the distributing vessel, substantially as described.

6. In an apparatus for the treatment or purification of water, the combination with a support subject to movement, of receiving vessels for the crude water and solutions, rigidly secured to said support, solution-making vessels, distributing devices for receiving crude water and subdividing the same, gimbals for normally maintaining the distributing devices and solution-making vessels in a horizontal position, pipes connecting the distributing devices with the solution making and receiving vessels respectively, and pipes connecting the solution-making vessels with the receiving vessels, substantially as described.

7. In a feed-water purifying or treating system, the combination with a vessel for dividing and distributing the crude water, of means for freely suspending and maintaining the same in a horizontal position when subjected to movement, and a hopper or funnel-shaped receiver adapted to receive and deliver the divided streams to where required, and to afford the necessary play to the distributing vessel, said receiver being partitioned into compartments for the separate streams, substantially as described.

8. In a feed-water purifying or treating system, the combination with a bowl-shaped tank, a trough surrounding it divided into compartments, and a revoluble distributer for delivering the water to the several subdivisions of the tank, of delivery-pipes on the under part of the tank connected with the respective divisions of the tank, gimbals for freely suspending and maintaining the distributer in a horizontal position when subjected to movement, and means for receiving and delivering the divided streams to where required and adapted to afford the necessary play to the distributer, substantially as described.

9. In a feed-water purifying or treating system, the combination with the treatment-tank, of a vessel for dividing or distributing the crude water, solution-making apparatus, means for freely suspending and maintaining said distributing and solution-making apparatus in a horizontal position when subjected to movement, flexible pipes adapted to take a fraction of the water from the distributing to the solution-making apparatus, and from the latter to the treatment-tank, and means for receiving and delivering the larger remaining portion of the water from the distributing vessel to the treatment-tank, and adapted to afford the necessary play to said distributer, substantially as described.

10. In a feed-water purifying or treating system, the combination of treatment-tank J having internal partition Y mixing-tubes I and tubes X, vessels for dividing or distributing the crude water, and for making and delivering the treating materials or solutions, gimbals M, N, P, adapted to support and maintain said vessels in a horizontal position when subjected to movement, receiver R, and flexible pipes K and T, substantially as described.

In witness whereof I have hereunto signed my name, this 2d day of November, 1901, in the presence of two subscribing witnesses.

ANTHONY HARRIS.

Witnesses:
WILLIAM G. CLEGG,
WILLIAM H. CURRIE.